(12) United States Patent
Schmulewitz

(10) Patent No.: US 7,247,953 B1
(45) Date of Patent: Jul. 24, 2007

(54) SOLAR ENERGY CONVERSION AND TRANSMISSION SYSTEM

(76) Inventor: Stanley Schmulewitz, 3801 Connecticut Ave. NW., #407, Washington, DC (US) 20008

( * ) Notice: Subject to any disclaimer, the term of this patent is extended or adjusted under 35 U.S.C. 154(b) by 0 days.

(21) Appl. No.: 11/481,065

(22) Filed: Jul. 6, 2006

(51) Int. Cl.
*F02B 63/04* (2006.01)
*F03G 7/08* (2006.01)
*H02K 7/18* (2006.01)

(52) U.S. Cl. .................................... 290/1 R
(58) Field of Classification Search ............... 290/1 R; 60/641.12, 641.11, 659; 320/101; 323/906
See application file for complete search history.

(56) References Cited

U.S. PATENT DOCUMENTS

| | | | | |
|---|---|---|---|---|
| 3,028,488 | A * | 4/1962 | Hudspeth et al. ............. | 455/23 |
| 3,781,647 | A * | 12/1973 | Glaser ........................ | 322/2 R |
| 3,933,323 | A * | 1/1976 | Dudley et al. ............... | 244/1 R |
| 4,280,328 | A * | 7/1981 | Falconer ..................... | 60/641.12 |
| 5,394,075 | A * | 2/1995 | Ahrens et al. ............... | 320/101 |
| 5,593,549 | A * | 1/1997 | Stirbl et al. .................. | 203/10 |
| 5,996,943 | A * | 12/1999 | Gode ......................... | 244/172.7 |
| 6,279,321 | B1 * | 8/2001 | Forney ....................... | 60/641.11 |
| 2003/0098058 | A1 * | 5/2003 | Takada et al. ............... | 136/244 |
| 2003/0192586 | A1 * | 10/2003 | Takada et al. ............... | 136/292 |
| 2005/0134440 | A1 * | 6/2005 | Breed ......................... | 340/435 |
| 2006/0185726 | A1 * | 8/2006 | Rogers et al. ............... | 136/292 |

OTHER PUBLICATIONS

Frank E. Little: "Power from Space: From Promise to Reality," Texas A&M University, Center for Space Power; URSI EMTS 2004, pp. 311-313.

* cited by examiner

*Primary Examiner*—Julio Gonzalez
(74) *Attorney, Agent, or Firm*—Armstrong, Kratz, Quintos, Hanson & Brooks, LLP

(57) ABSTRACT

A system consisting of one or more satellites carrying photovoltaic panels that capture solar energy and convert it to electricity for storage and transmission to earth by a microwave energy beam. The earth station absorbs the microwave energy beam in a pressurized pool of water with an insulated dome cover. The dome cover allows the microwaves to enter but turns back the heat emanating from the pool. Succeeding microwave energy beams from the satellites heat the water which transfers the energy to another pool that is maintained in a constant boiling state to develop steam which drives a turbine that turns a generator and produces electric energy. The satellites follow a slightly off-polar orbit which assures their passing over large areas of the earth while at the same time following the earth's rotation assuring repeated passage over the same stations.

9 Claims, 5 Drawing Sheets

SOLAR ENERGY CONVERSION AND TRANSMISSION SYSTEM

BACKGROUND OF THE INVENTION

1. Field of the Invention

The present invention is related to a space based system for conversion of solar energy to electrical energy to be transmitted to earth stations by microwave beams.

2. Description of the Related Art

Mankind on earth is faced by two enormous and related problems. One is the rapid decline of oil reserves hastened by the increased demand for the oil itself. The other is global warming caused by the burning of oil and other fossil fuels. Solutions offered may solve one or the other but not both. Biomass is renewable but depends on combustion which exacerbates global warming. Wind turbines and terrestrial solar panels eliminate combustion but are limited to locations that are not necessarily near those in great energy need. Solar panels require a great deal of expensive real estate to serve areas of high population density. Wind turbines create "visual" pollution.

Receiving and converting solar energy in space and transmitting it to earth appears to be an innovative and exotic way of obtaining energy. However, calculating the energy to be thus received involves variables such as the size and number of satellites used. The amount of energy available from the sun must first be calculated. The following calculations illustrate this:

(a) Solar energy incident on one square meter of earth is 1000 watts. Current technology for solar panel construction permits conversion of this level of solar energy to 200 watts of electrical energy.

(b) In space, because of the lack of atmosphere, 1350 watts is incident on one square meter. This may be converted to 270 watts of electricity.

(c) The solar energy headed for the earth is the energy falling in a plane projection of the earth. Assuming an earth radius of 4000 miles, with 1609 meters/mile, the radius of the projection is $6.436 \times 10^6$ meters. The area of the projected disk is $\pi r^2 = 3.14 \times (6.456)^2 \times 10^{12} = 1.301 \times 10^{14}$ m$^2$.

(d) FIG. 2 shows the earth 60 as it moves one quarter of its yearly revolution about the sun 1, with a near polar satellite orbit which produces 75% average sunlight exposure for the satellite. Combining this arrangement with the assumption of (b) above; the calculation of (c) above and an interception rate of 0.1% of the solar energy directed toward earth yields a power calculation of $1.301 \times 10^{14} \times 0.75 \times 270 \times 10^{-3} = 263.5 \times 10^{11} = 26.4 \times 10^{12}$ watts=26.4 million megawatts. In comparison, Hoover Dam has a capacity of 1500 megawatts. Solar power calculated above is the equivalent of $26.4 \times 10^6 / 1.5 \times 10^3 = 17.6 \times 10^3$ or 17,600 Hoover Dams.

While there is no working energy satellite system currently in operation, there are many concepts of such systems. One such prior art system uses transmission from satellite antennas to ground antennas, resulting in an intermittent flow of energy. A geosynchronous satellite would provide continuous energy for 12 hours/day but its great distance from earth (23,5000 miles) would result in significant energy spread upon transmission to earth.

Orbits of satellites in various prior art systems are usually equatorial. This places the satellites over the Pacific, Atlantic and Indian Oceans and over northern South America and Central Africa. These are not areas of great energy usage, and an equatorial system is by definition limited to a single orbital plane. Typical microwave frequencies used in current concepts are approximately 2 GHz.

SUMMARY OF THE INVENTION

There is a need to improve upon the coverage and the continuity of energy generation of the systems of the prior art. The present invention utilizes near-polar orbits which pass over all portions of the earth, including the heavily industrialized continents of North America and Europe. In addition, energy can be provided to developing areas not easily supplied with fossil fuels. The present invention utilizes a large body of a liquid, preferably water, which may be heated by incoming microwave energy beams transmitted by one or more space satellites to generate electric power.

More specifically, the present invention captures solar energy with low earth orbit satellites, converts the solar energy to electrical energy and transmits the electrical energy to earth with a microwave beam. The solar energy is captured and converted to electrical energy by photovoltaic panels. The satellites are placed in near polar orbit, reaching approximately 80° latitude, which enables them to cover all areas of earth, particularly those of greatest energy usage, while allowing each satellite to repeatedly pass over the same earth stations. Each earth station contains a primary pool of water which is heated by repeated beams of microwave energy. That pool is pressurized and can be heated above 100° C., which is the boiling point of water at sea level barometric pressure. The heat is transferred to a secondary pool of water which is brought to and maintained in a boiling state. This drives a turbine which turns a generator to produce electricity.

The present invention provides the possibility of almost unlimited expansion. It can include one or a plurality of satellites in one or a plurality of orbits. It may utilize many small satellites or a few large ones. For example, one orbit of 25,000 miles in length may contain 250 satellites 100 miles apart. One orbit for each longitudinal circle would yield 180 orbits and combining these calculations yields 45,000 satellites.

DETAILED DESCRIPTION OF AN EXEMPLARY EMBODIMENT

Figure 1:
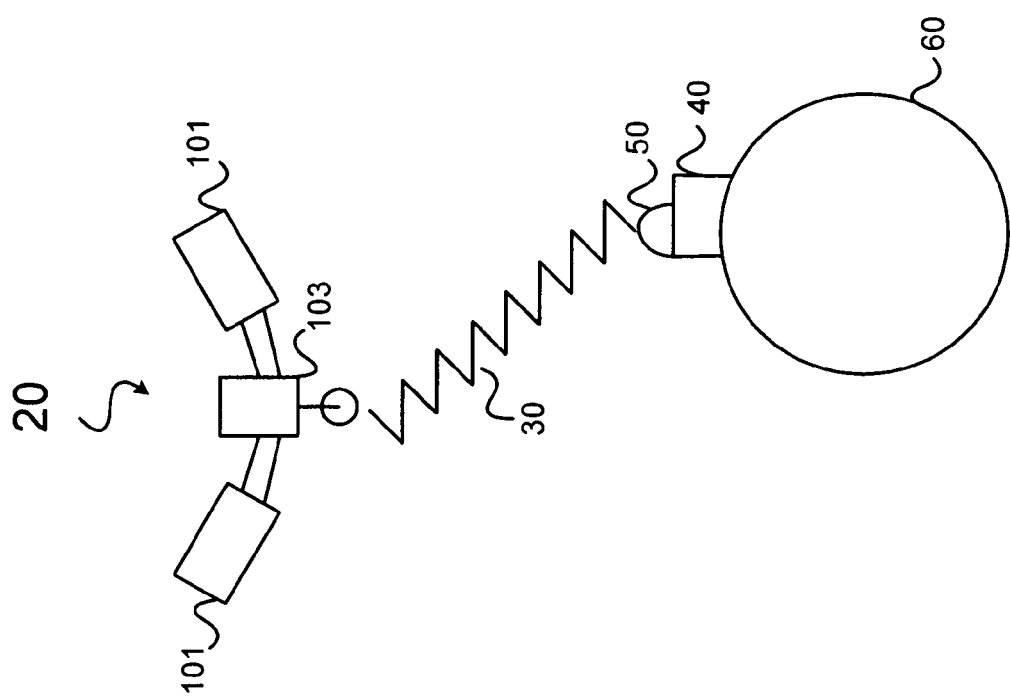
FIG. 1 is an overview diagram of the space microwave power generation system of the present invention.

FIG. 1 is an overview of satellite 20 orbiting the earth 60 in a near polar orbit, showing solar panels 101, microwave transmitter 103, microwave energy beam 30, and earth station 40, including dome 50 which receives microwave energy beam 30.

Figure 2:
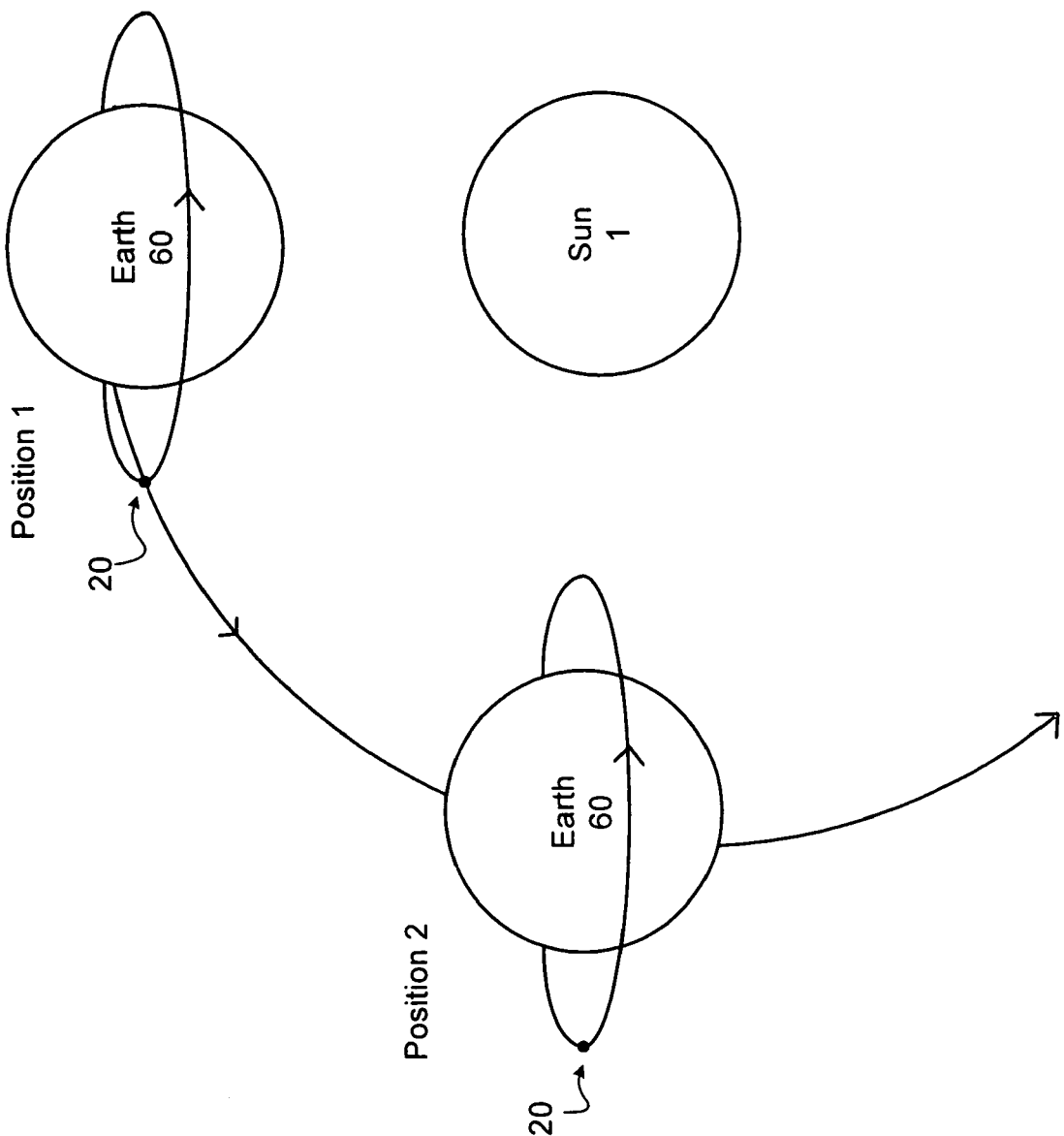
FIG. 2 is a diagram of the earth's orbit around the sun from above showing the preferred orbit of the satellites.

FIG. 2 illustrates one-quarter of the earth's orbit around the sun 1 as seen from above. The earth 60 in position 1 shows the satellite 20 revolving around the earth in a near-polar orbit. In this position, the satellite will be exposed to the sun nearly 24 hours/day. After moving along the earth's solar orbit to position 2, the satellite 20 will be exposed to the sun slightly less than 12 hours/day. Therefore, the average daily exposure on an annual basis will be a little less than 18 hours/day or 75% of the time.

Figure 3:
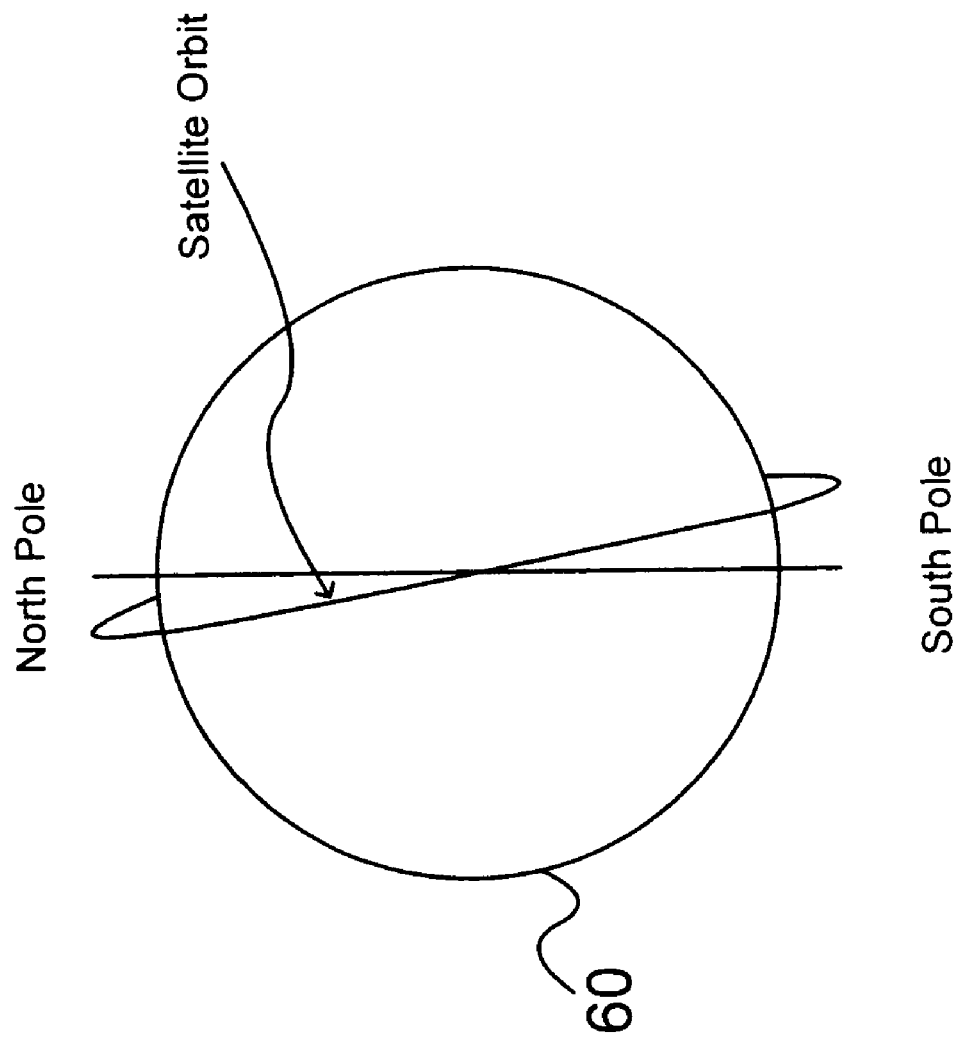
FIG. 3 is a plan view of the near polar orbit of one embodiment of the invention.

FIG. 3 represents another view of the satellite's orbit. The satellite will be in low earth orbit, similar to that of the space shuttle, with an altitude of about 300 miles and an orbiting time of approximately 90 minutes. If the orbit were to be exactly polar, each time the satellite passes over the same spot the earth will have rotated 22.5° east (360×1.5/24). To assure that the satellite serves the same earth stations on each pass, it would be necessary for the satellite to move 1° east for each 16° south. This can be accomplished with an off-polar orbit as shown in FIG. 3.

Figure 4:
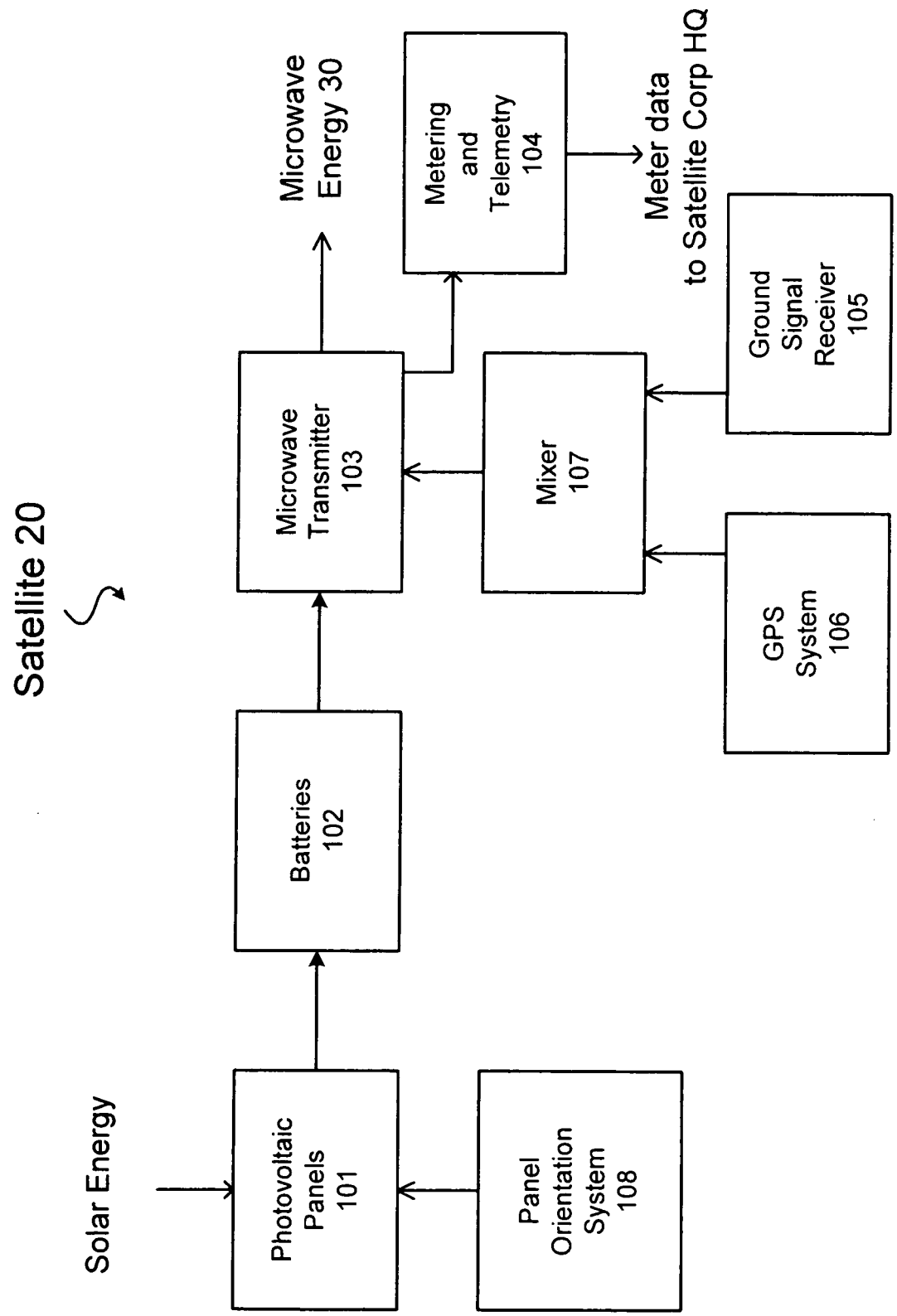
FIG. 4 is a block diagram of a satellite of the present invention.

FIG. 4 is a block diagram of the satellite 20. Solar energy is received and converted to electrical energy by the photovoltaic solar panels 101 and stored in batteries 102. When the satellite 20 is within a predetermined distance of an earth station 40, the microwave transmitter 103 sends down a beam of energy 30. The direction and timing of the beam 30 is controlled by the GPS system 106 and confirmed by a ground signal detected by a ground signal receiver 105 in the satellite 20. The two signals are matched for corroboration by a mixer 107 and fed to the transmitter 103. The transmitted energy beam 30 is metered with the resulting data transmitted by the metering and telemetering system 104. A panel orientation system 108 keeps the photovoltaic solar panels 101 constantly aimed at the sun 1.

Figure 5:
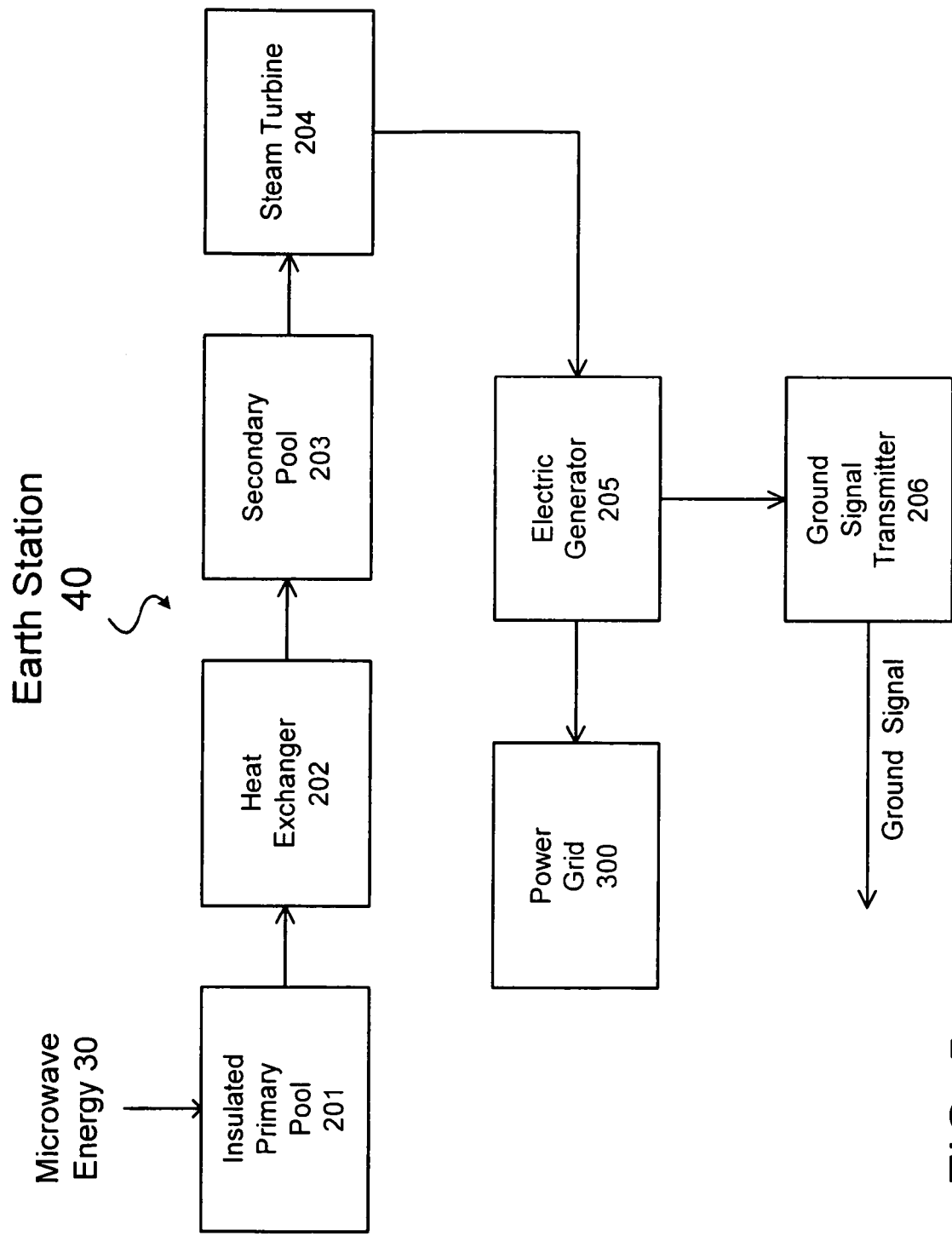
FIG. 5 is a block diagram of an earth station of one embodiment of the invention.

FIG. 5 is a block diagram of the earth station 40. The insulated primary pool 201 is preferably a pool of water under an insulated pressurized dome 50. Each beam of microwave energy 30 penetrates the insulated dome 50 but the dome 50 retains the heat emanating from the water. The energy beams 30 bring the pressurized water above the atmospheric boiling point of 100° C. The water flows to a heat exchanger 202 that passes the heat to a secondary pool 203. The secondary pool 203 will thus receive a more continuous flow of energy that will permit constant boiling to power the steam turbine 204 that will drive the electric generator 205 and send electricity preferably to the user power grid 300. Once started, the generator 205 can also power the ground signal transmitter 206, which sends timing information to the ground receiver 105 in the satellite 20.

While an exemplary embodiment has been shown and described, it will be obvious to those skilled in the art that various changes and modifications can be made therein without departing from the scope of the invention as defined by the appended claims.

What is claimed is:

1. A solar energy conversion and transmission system comprising:
   one or more energy converting satellites, each of which has one or more solar panels for converting solar energy to electrical energy, batteries for storing the generated electrical energy, and a microwave transmitter, powered by the stored electrical energy, for transmitting a microwave energy beam to the earth; and
   one or more earth stations for receiving a microwave energy beam transmitted by the one or more satellites and transforming the received microwave energy to electrical energy,
   wherein each of said one or more earth stations includes:
   a primary body of pressurized liquid contained under an insulated dome; and
   a heat exchanger for receiving the heat generated by said liquid;
   a secondary body of liquid which is maintained in a constant boiling state by heat energy received by said heat exchanger; and
   an electric generator means for producing electric energy by utilizing the steam generated by said secondary body of liquid.

2. The solar energy conversion and transmission system as recited in claim 1, wherein said one or more earth stations each includes a ground signal transmitter which sends directional signals and timing signals to said one or more satellites for determining proper direction and timing of the microwave energy beam so that said beam arrives at said one or more earth stations.

3. The solar energy conversion and transmission system as recited in claim 1, wherein each of said one or more satellites includes a global position system apparatus for determining accurate positioning of each of said one or more satellites over each of said one or more earth stations so that each of said one or more satellites may use a predetermined position of each of said one or more stations relating to each of said one or more satellites to assist in determining both the timing and the direction of the microwave energy beams.

4. The solar energy conversion and transmission system as recited in claim 1, wherein said liquid is water.

5. The solar energy conversion and transmission system as recited in claim 1, wherein said electrical energy provided by said one or more earth stations is transmitted to a power grid for user consumption.

6. The solar energy conversion and transmission system as recited in claim 2, wherein the microwave beam is transmitted when said one or more satellites are within a predetermined distance from said one or more earth stations.

7. A method of converting solar energy obtained from one or more solar panels arranged on one or more satellites in a near polar earth orbit, the one or more satellites containing batteries and a microwave transmitter for transmitting microwave beams to one or more earth stations to be ultimately converted to electrical energy, comprising the steps of:
   receiving solar energy by said one or more solar panels;
   converting the received solar energy to electrical energy via a photovoltaic process;
   storing the electrical energy in one or more batteries;
   transmitting the stored electrical energy to a microwave transmitter;
   transmitting a microwave beam to said one or more earth stations at a predetermined timing;
   receiving said microwave beam at one or more earth stations such that said microwave beam directly impinges upon and heats at least one body of liquid to produce steam;
   using said produced steam to drive an electrical generator to generate electrical energy.

8. The method recited in claim 7, wherein said liquid is water.

9. A method of converting solar energy obtained from one or more solar panels arranged on one or more satellites in a near polar earth orbit, the one or more satellites containing batteries and a microwave transmitter for transmitting microwave beams to one or more earth stations to be ultimately converted to electrical energy, comprising the steps of:
   receiving solar energy by said one or more solar panels;
   converting the received solar energy to electrical energy via a photovoltaic process;
   storing the electrical energy in one or more batteries;
   transmitting the stored electrical energy to a microwave transmitter;
   transmitting a microwave beam to said one or more earth stations at a predetermined timing;

receiving said microwave beam at one or more earth stations and using said microwave beam to heat at least one body of liquid to produce steam;
using said produced steam to drive an electrical generator to generate electrical energy, wherein said microwave beam heats a first pressurized body of liquid, which then heats a second body of liquid via a heat exchanger to produce steam.

* * * * *